United States Patent [19]

Kopf et al.

[11] Patent Number: 4,559,247

[45] Date of Patent: Dec. 17, 1985

[54] LACTONE GRAFTED POLYETHERS IN COATINGS FOR DEFORMABLE SUBSTRATES

[75] Inventors: Peter W. Kopf, Belle Mead; Charles N. Merriam, Martinsville, both of N.J.

[73] Assignee: Union Carbide Corporation, Danbury, Conn.

[21] Appl. No.: 534,070

[22] Filed: Sep. 20, 1983

[51] Int. Cl.[4] .................. B05D 3/02; B32B 27/38; C08G 59/16

[52] U.S. Cl. ................... 427/386; 428/413; 428/418; 525/533; 525/930

[58] Field of Search ............. 525/533, 930; 428/418, 428/413; 427/386

[56] References Cited

U.S. PATENT DOCUMENTS

| 3,203,920 | 8/1965 | Nikles et al. | |
|---|---|---|---|
| 3,356,646 | 12/1967 | Wynstra | 528/101 |
| 3,382,210 | 5/1968 | Wyart | 525/533 |
| 3,925,504 | 12/1975 | Koleske | 525/533 |
| 4,009,223 | 2/1977 | Noonan | 428/418 |
| 4,212,960 | 7/1980 | Hayashi | 525/930 |

OTHER PUBLICATIONS

A. N. Theodore and M. S. Chatta, "Modification of Acrylic Polymers for High Solids Coatings", *Journal of Coatings Technology*, vol. 54, No. 693, pp. 77–81 (Oct. 1982).

*Primary Examiner*—John C. Bleutge
*Assistant Examiner*—Patricia Short
*Attorney, Agent, or Firm*—Jean B. Mauro

[57] ABSTRACT

Coating compositions based on a binder which is the reaction product of lactone grafted onto hydroxy substituted polyphenylether possess improved properties useful for deformable substrates.

15 Claims, No Drawings

LACTONE GRAFTED POLYETHERS IN COATINGS FOR DEFORMABLE SUBSTRATES

BACKGROUND OF THE INVENTION

1. Field of the Invention

This invention relates to coating compositions, and more particularly to improved coatings for deformable substrates such as elastic material and pre-coated metals subjected to deformation processing.

2. Description of the Prior Art

Hydroxyalkoxy phenoxy polyether resins, such as those disclosed in U.S. Pat. No. 3,356,646, (Wynstra, et al.), are useful as binders, i.e., vehicles in coating compositions for pre-coated metal products. These resins provide superior toughness and resistance, particularly for metal substrates in exhibiting superior corrosion resistance and adhesion. In mamy applications, pre-coated metal is prepared on a coil coating line where a crude coil is uncoiled, cleaned, pre-treated, painted, dried, cooled and finally recoiled. In subsequent manufacture, such products are frequently subjected to various deformation operations. For example, various metal parts are formed from such coils in stamping and forming operations to give pre-coated sheet metal parts for appliances, automobiles and the like.

Such stamping and forming operations severely distress both the metal and the coating resulting in coating deficiencies such as cracks, chips, or peels in the highly distored or elongated regions of the deformed metal. Consequently, the coated metal part is no longer commercially acceptable nor suitably protected from the environment.

It would therefore be desirable to provide a phenoxy polyether coating composition for deformable substrates which will perform satisfactorily during and subsequent to deformation operations.

SUMMARY OF THE INVENTION

This invention relates to coating compositions comprising a binder for deformable substrates. The binder is a high molecular weight polymer which is the reaction product of a hydroxyalkoxy phenoxy polyether and a lactone. The invention also relates to a process for producing a coated, deformed article using this coating composition, and the article thereby produced.

DETAILED DESCRIPTION OF THE INVENTION

It has been discovered that chemical modification of high molecular weight, hydroxyalkoxy phenoxy polyethers by reaction with lactone monomer, producing a lactone grafted polyether, provides improved coating performance when such material is applied as a binder to deformable substrates. These grafted polymers have been found to exhibit improvements in impact resistance, hardness, gloss, drawability and deformability.

The polymeric binder used in this invention is a high molecular weight polymer which is a lactone modified hydroxy substituted polyphenylether. This polymer is the reaction product of a lactone and a hydroxyalkyl phenoxy polyether.

The lactone reactant has the formula:

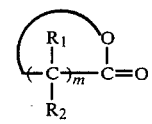
(I)

wherein each $R_1$ and $R_2$ is individually hydrogen or lower alkyl, and m is from 3 to about 12. As such, the substituents of each $R_1$, or $R_2$, group may vary along the carbon chain. Preferably, $R_1$ and $R_2$ are all hydrogen, except that one hydrogen may be replaced by a methyl group.

Some representative examples of lactones of formula (I) include caprolactone, methyl-caprolactones, valerolactone, octanolide, dodecanolide, and the like. Preferred lactones include caprolactone, methyl-substituted caprolactones, and valerolactone.

The hydroxyalkoxy phenoxy polyether reactant has the average formula:

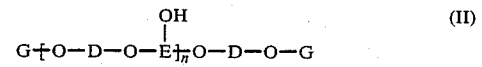
(II)

wherein D is the residue of a dihydroxy aromatic hydrocarbon; E—OH is the hydroxy residue of an epoxide; G is either hydrogen or the residue of a capped or uncapped epoxide; and n is sufficient to provide a weight average molecular weight of at least about 30,000. Depending upon the molecular weight of the constituent residues within the polyether, the degree of polymerization, represented by n, will usually be at least 30, and preferably 50 or more. The polyethers include the polymers described as thermoplastic polyhydroxyethers in U.S. Pat. No. 3,356,646 (Wynstra, et al.), which patent is incorporated herein by reference.

The polyethers can be prepared by interreacting (1) a dihydric phenol, preferably polynuclear in which the hydroxyl groups are attached to different nuclei, with (2) a substantially equimolar amount of epoxide and (3) an excess over stoichiometric proportions of an alkali metal hydroxide; in aqueous solution at the reflux temperature of the mixture until a prepolymer is formed. The mixture is then heated to about 150°–120° C. until a polyether, having a reduced viscosity of at least 0.45 dl/gm, measured at 25° C. at a 0.2 gram sample in 100 ml. of tetrahydrofuran, and a weight average molecular weight of at least about 30,000, is obtained.

The reduced viscosity values can be computed using the equation:

$$\text{reduced viscosity} = \frac{t_s - t_o}{ct_o}$$

wherein $t_o$ is the efflux time of the solvent (tetrahydrofuran), $t_s$ is the efflux time of the polyether solution, and c is the concentration of the polyether solution in terms of grams of polyether per 100 ml. of tetrahydrofuran.

The terminal group of the polyether, G, may provide an average of from 0 to 2 terminal epoxy groups. Due to the high molecular weight and degree of polymerization, the presence of such epoxy groups is insignificant, such that the polymer is substantially free of 1,2-epoxy groups. These terminal epoxy groups may be modified through the addition of capping agents which react with the epoxy group to provide a hydroxyl group on the carbon atom adjacent to the terminal carbon atom and a terminal capping group. Typical capping agents include superheated water or mineral acids to provide terminal hydroxyl groups, i.e. glycols; lower alkyl carboxylic acids to provide terminal alkyl esters; or phenols to provide terminal phenoxy groups.

The dihydric phenol providing the residue of a dihydroxy aromatic hydrocarbon, D, can be either a dihydric mononuclear phenol or a polynuclear phenol. Such phenols have the general formula:

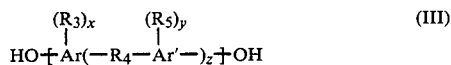
(III)

wherein Ar and Ar' are individually a aromatic divalent hydrocarbons; $R_3$ and $R_5$ are individually lower alkyl, halogen, or lower alkoxy; $R_4$ is a covalent bond or divalent radical; x and y are from 0 to a maximum value corresponding to the number of substitutable sites on Ar and Ar', respectively; and z is 0 or 1. The divalent radical, $R_4$, includes, for example, such groups as: (1) divalent hydrocarbon radicals such as alkylene; alkylidenes; cycloaliphatics, (e.g., cycloalkylene and cycloalkylidene); halogenated, alkoxy or aryloxy substituted alkylenes, alkylidene and cylcoaliphatic radicals; alkarylene and aromatic radicals including halogenated, alkyl, alkoxy or aryloxy substituted aromatic radicals; two or more alkylidene radicals separated by an aromatic ring; and a ring fused to an Ar group; (2) polyalkoxy; (3) polysiloxy; (4) a tertiary amino group; (5) an ether linkage; (6) a carbonyl group; or (7) a sulfur containing group, such as sulfoxide; and the like.

Preferred dihydroxy aromatic hydrocarbons include phenols set forth in formula (III) for when Ar and Ar' are phenylene, z is 1 and $R_4$ is a divalent saturated aliphatic hydrocarbon radical, particularly alkylene and alkylidene radicals having from 1 to 3 carbon atoms

and cycloalkylene radicals having up to and including 10 carbon atoms. Preferably x and y are each 0. Particularly preferred phenols are bis(hydroxyphenyl)alkanes, such as 2,2-bis(4-hydroxyphenyl)propane providing a residue D of

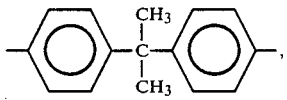

The epoxide contributing the hydroxy residue, E, can be a monoepoxide or diepoxide. The term "epoxide" defines a compound containing a oxirane group, i.e., oxygen bonded to 2 vicinal aliphatic carbon atoms forming a three-membered ring. Monoepoxides contain one such oxirane group and provide a residue E containing a single hydroxyl group. Diepoxides contain two such oxirane groups and provide a residue E containing two hydroxyl groups.

Epoxides having a terminal oxirane group, i.e., 1,2-epoxides, are preferred. Saturated epoxides, i.e., free of ethylenic unsaturation, and acetylenic unsaturation are also preferred.

Preferred diepoxides contain oxirane groups each connected to an electron donating group which is not immediately connected to the carbon atoms of the oxirane group. The electron donating group may be selected from the following:

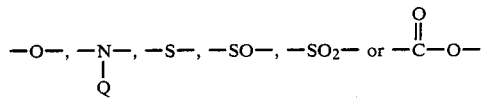

wherein Q is a saturated carbon radical such as an alkyl, cycloalkyl, aryl or aralkyl radical.

Particularly preferred saturated diepoxides contain solely carbon, hydrogen and oxygen, especially wherein the vicinal or adjacent carbon atoms form a part of an aliphatic hydrocarbon chain. Oxygen in such diepoxides can be, in addition to E oxirane oxygen, ether oxygen, —O—; oxacarbonyl oxygen,

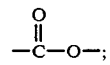

carbonyl oxygen,

and the like.

Particularly preferred monoepoxides have the formula:

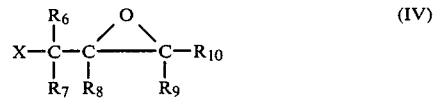
(IV)

wherein $R_6$, $R_7$, $R_8$, $R_9$ and $R_{10}$ are individually hydrogen or methyl and X is an electron donating group providing residues such as

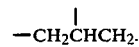

Most preferred compounds are those in which X is halogen, i.e. the epihalohydrins. Specific examples of epihalohydrins include epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

The relative proportions of polyether to lactone will vary depending upon the amount of grafting desired in order to achieve a desired extent of modification of the reaction product properties as compared to unreacted polyether. Generally, the ratio of lactone to polyether, in parts by weight, will be between about 0.05 to about 5:1, preferably between about 0.1 to about 0.5:1; and most preferably between about 0.15 to about 0.3:1.

The reaction may be conducted in the presence of a solvent which may be a non-hydroxy compound which is liquid and substantially inert to the reactants under the reaction conditions. Such solvents include hydrocarbons; ether; glycol ether esters, such as ethylene glycol ethyl or butyl ether acetates; ketones; high boiling naphthas; and the like. Preferred solvents include anisole, cyclohexanone, diethylene glycol dimethyl ether, and hydrocarbon mixtures, such as Exxon 150, which is a mixture of alkyl substituted aromatic hydrocarbons, produced by Exxon Corporation.

A catalyst is usually provided to assist the reaction between the lactone and the polyether. Such catalysts promote opening of the lactone ring for reaction as well as enhancing reaction rates. Typical catalysts include metal salts, such as metal alkoxides, halides, alkyls, hydrides and salts of organic acids, and mineral acids. Preferred catalysts include tin carboxylates; organic sulfonic acids, for example toluene sulfonic acid; and sulfuric acid. Particularly preferred catalysts include metal salts of aliphatic carboxylic acids, such as stannous octoate, dibutyl tin dilaurate and the like.

The reaction conditions may be selected from the standard procedures for conducting polymer grafting, via condensation reactions established in the art. The reaction may be conducted at any standard pressure, although atmospheric pressure is preferred. The reaction temperature will usually be between about 100° to 250° C. preferably between about 150° C. up to the boiling point of the solvent, if used. Most preferred reaction temperatures range between about 170° to 200° C.

In a typical embodiment, either the lactone or polyether reactant is added to a reactor vessel, with or without solvent, and heated to the desired reactor temperature, with the addition of the remaining reactant. The material is heated to reflux and catalyst is charged to the reactor, usually in two separate charges. The reaction is usually conducted at reflux or just below reflux temperature. The reaction is permitted to go to completion, usually after several hours. The solid polymer product may be directly formulated into a coating, or recovered by coagulation, washed with water and filtered to isolate substantially pure product.

The lactone modified hydroxy substituted polyphenylether is a high molecular weight, thermoplastic polymer, having the average formula:

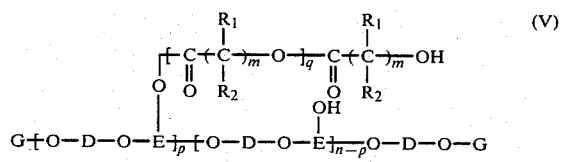

wherein D, E, G, R$_1$, R$_2$, m ad n are as defined previously: p is from about 0.01n to n; and q is $\geq 0$. The degree of grafting, p, stated as a fraction of the average number of hydroxyl groups defined by n, is preferably from about 0.01 to about 0.5, and most preferably from 0.1 to about 0.3. The average number of repeating lactone residue units per graft, q+1 is $\geq 1$, preferably from 1 to about 10, and most preferably from about 2 to about 5. In the broadest sense, the extent of grafting will range from a minimum amount required to provide measurably improved coating properties up to a maximum amcount which, due to the preponderance of polylactone grafts exhibits a substantial decrease in hardness resulting in reduced coating utility. The lactone grafts are located at the reacted hydroxyl sites in a random distribution along the polyether backbone.

Using the preferred reactants of 2,2-bis(4-hydroxyphenyl)propane and epihalohydrin to provide the hydroxyalkyoxy phenoxy polyether, and caprolactone as the lactone grafting monomer, a preferred lactone modified hydroxy substituted polyphenylether is provided having the average formula:

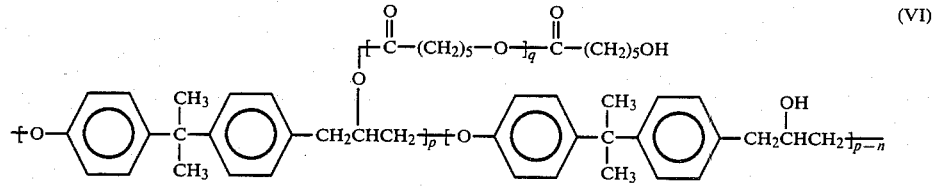

The lactone modified polyethers are particularly useful as binders in coating compositions for pre-coated, deformable substrates. Such coating compositions consist essentially of the lactone modified polyether base. Additional materials may optionally be provided including pigments, crosslinkers, cure initiators, carriers (i.e., solvents), dispersants, flow control agents, anti-settling agents and the like. Standard materials and proportions of these components may be used following well established procedures.

Deformable substrates are those materials which undergo, or have the capability of undergoing, deformation subsequent to the coating operation. Deformable substrates include bendable, elastic or pliable metal or plastic material. Such deformation may either be permanent or temporary. Permanent deformation occurs when an inelastic, pre-coated substrate, such as metal, is subjected to a deformation or shaping operation in which at least a portion of the substrate surface is bent or extended in some manner. Typical deformation operations include stamping or other similar procedures, which alter the substrate configuration. Stamping of pre-coated metal parts, such as in the preparation of auto body parts, is an example of substantially permanent deformation. Deformable substrates also include materials which are elastic or flexible such that deformation can occur either temporarily or permanently when the materials are further processed or used. Representative examples of such deformable substrates include films, wire, and pliable sheet, such as reaction injected molded, i.e. RIM, polyurethane, tubular or laminar materials.

Preferred deformable substrates include pre-coated metal or plastic articles which are subjected to shaping operations in preparation for their end uses. Particularly preferred substrates are pre-coated metal or RIM plastic articles which are subjected to stamping or similar shaping operations.

In a typical embodiment, a coating composition is prepared by mixing the lactone modified polyether with up to minor proportions of crosslinker and cure initiator in the presence of a major proportion of solvent. A minor or major proporton of pigment may also be provided. Coatings which contain crosslikers may then be cured by heating, irradiation or other well established curing procedures.

Coating compositions of the invention may be applied to deformable substrates using standard coating procedures. The coated substrate is usually dried, and may then be subjected to deformation.

It has been discovered that coating compositions containing the lactone modified polyether possess an unexpectedly superior balance of properties when applied to deformable substrates. Improvement in impact resistance, hardness, gloss, drawability and deformability have been demonstrated for coatings with or without pigment, crosslinkers and other nonessential additives. When applied to pre-coated deformable substrates, the lactone modified polyether coatings not only provide superior integrity during and subsequent to deformation operations, but exhibit a desirable balance of improved properties when compared with coatings containing the unmodified polyether binder. Such performance was achieved without the presence of or need for additional components, although other components may optionally be provided.

EXAMPLES

The following examples are representative of preferred embodiments of this invention, and may be varied over the entire scope of the invention as previously described. The shorthand designations used in the examples are defined as follows:

| Designation | Description |
|---|---|
| Anti-settling agent I | A wax distributed under the tradename MPA-60 by N.L. Industries. |
| Carrier I | Ethylene glycol ethyl ether acetate |
| Carrier II | Diethylene glycol dimethyl ether |
| Catalyst I | Stannous octoate |
| Crosslinker I | Hexamethoxy methyl melamine |
| Crosslinker II | Amino-bis[3-propyltrimethoxysilane] |
| Crosslinker III | A hexamethylene diisocyanate derivative distributed under the tradename Desmondur N-75 by Mobay Chemical Co. |
| Crosslinker IV | Trimethoxy methyl melamine |
| Cure initiator | p-toluene sulfonic acid |
| Dispersant I | A pigment dispersant distributed under the tradename Nuosperse 657 by Tenneco. |
| Drier I | Calcium oxide |
| Lactone I | Caprolactone |
| Polyether I | A 2-hydroxypropoxy, 2,2-bis (4,4'phenoxy)propane polyether having a weight average molecular weight, $\overline{M}_w$ of 66,800 and a number average molecular weight, $\overline{M}_n$, of 16,200, containing substantially equal proportions of terminal epoxy and glycol groups |
| Solvent I | A high boiling naphtha which is a mixture of alkyl substituted aromatic hydrocarbons distributed under the tradename Exxon ® 150 by Exxon Corp. |

Examples 1–5

Preparation of Lactone Grafted Polyethers

These examples describe the preparation of lactone grafted polyethers used in this invention, using the amount of material set forth in Table 1 and the following procedures.

Example 1

The hydroxyalkyloxy phenoxy polyether, Polyether I, was pre-dried overnight in an oven at 90° C. The lactone, Lactone I, was purified by distillation and stored over molecular seives, prior to use.

A solvent, Solvent I, was weighed into a reactor vessel. Polyether was added and the mixture heated to reflux, providing a vapor temperature of 178° C. The mixture was stirred for half an hour, providing a vapor temperature of 181° C. Heating was temporarily discontinued, and the reflux stopped, to add caprolactone, providing a vapor temperature of 171° C. in the reactor vessel. The lactone addition provided a solubilizing effect while the mixture was stirred for several minutes without heating, providing a vapor temperature of 156° C. When the mixture was almost completely dissolved, heating was resumed to provide a reflux at a mixture temperature of 192° C. Refluxing was continued at 194° C. for several minutes, at which time half the total charge of catalyst, Catalyst I, was added in 20 ml of Solvent I. The mixture was reheated to reflux at 194° C. and reacted for three hours to provide a final reaction temperature of 196° C. Heating was again temporarily discontinued while the remaining charge of catalyst was added to the mixture of 190° C. Heating was resumed to provide a reflux temperature of 195° C. The reaction temperature was reduced to below reflux at 188°–190° C. The reaction proceeded for three hours, at which time the heating was discontinued and the mixture allowed to cool to 165° C. Carrier solvent, Carrier I, was slowly added to the mixture with rapid stirring. The mixture was then cooled to 85° C.

The product mixture contained slight turbidity and was dark amber colored. A portion of the mixture, 30 grams, was removed and the solids recovered by coagulation through the addition of 180 ml isopropanol in a blender. The coagulant was washed twice with approximately 200 ml of distilled water after the isopropanol had been decanted from the blender. The recovered solid product was dried in a Buchner funnel, using a filter cloth and placed in an evacuation oven to dry. The lactone grafted polyether product had a glass transition temperature, Tg of 64° C.

The remaining product, in carrier solution, was retained for coating preparation.

Example 2

Using a procedure similar to that in Example 1, a mixture of components set forth in Table 1 was formulated. The product had a Tg of 39° C.

Example 3

Based on the formulation in Table 1, lactone was weighed into a reactor vessel and heated to about 130° C. Polyether was added and the temperature raised to 155° C. After fifteen minutes, the addition was completed providing a viscous mixture which was slowly stirred. Heating was continued for fifteen minutes and the temperature raised to 160° C. at which time the mixture was sparged with nitrogen gas for half an hour. Half of the catalyst, Catalyst I, was charged to the reactor and the mixture heated to 180° C. Stirring was maintained at a low speed and the reaction allowed to continue for three hours. The remaining catalyst was charged to the reactor and the reaction continued for a little under three hours. The resulting product was extremely viscous. The mixture was allowed to cool to room temperature. The product was recovered by coagulation using the procedure as in Example 1, particulated and dried over night to provide 66.6 gm of product. The product had a Tg of 39° C.

Example 4

The procedures of Example 3 were substantially repeated based on the formulations set forth in Table 1. The lactone grafted polyether product possessed a Tg of 25°–30° C.

Example 5

The procedures of Example 3 were repeated but using the formulations set forth in Table 1 to provide a lactone grafted polyether product having a Tg of −15° C.

TABLE 1

LACTONE GRAFTED POLYETHER PREPARATION

| Component | Weight (gms) | | | | |
|---|---|---|---|---|---|
| | Ex. 1 | Ex. 2 | Ex. 3 | Ex. 4 | Ex. 5 |
| Polyether I | 600 | 100 | 100 | 600 | 400 |
| Lactone I | 90 | 30 | 40 | 264 | 508 |
| Solvent I | 360 | 100 | — | — | — |
| Catalyst I$^a$ | 12$^a$ | 2$^a$ | 2$^a$ | 12$^a$ | 8$^a$ |
| Carrier I | 1440 | 200 | — | — | — |

$^a$in drops of approximately 20.6 mg/drop

Examples 6–12

Lactone Grafted Polyether Grafting Analysis

Using the experimental procedures as set forth above, the proportion of lactone reactant was varied with respect to the amount of polyether reactant as set forth in Table 2. The extent and type of grafting was analyzed using carbon-13 nuclear magnetic resonance, i.e., NMR, analysis. The degree of grafting, i.e., the average fraction of hydroxyl groups reacted, was evaluated by analysing the NMR peaks of the carbon atoms adjacent to the oxygen of the unreacted (hydroxyl) and reacted (ester) substituents. The graft length, i.e., the average number of repeating lactone residue units per graft, was evaluated based on the NMR peaks of carbon atoms adjacent the terminal (hydroxyl) and chain-linking terminal (ester oxygen) groups. The results of the grafting analysis is set forth in Table 2.

TABLE 2

LACTONE GRAFTED POLYETHER GRAFTING ANALYSIS

| Example | Caprolactone | | Grafting | |
|---|---|---|---|---|
| | Amount$^a$ | Mole %$^b$ | Degree$^c$ | Length$^d$ |
| 6 | 15 | 27 | 0.14 | 2.0 |
| 7 | 15 | 27 | 0.15 | 2.4 |
| 8 | 15 | 27 | 0.10 | 2.5 |
| 9 | 25 | 38 | 0.24 | 2.6 |
| 10 | 25 | 38 | 0.14 | 2.1 |
| 11 | 43 | 52 | 0.23 | 3.9 |
| 12 | 127 | 76 | 0.42 | 5.7 |

$^a$parts by weight per 100 parts of polyether reactant
$^b$calculated on hydroxy equivalents in polyether
$^c$average fraction of hydroxyl groups reacted
$^d$average number of lactone residue units per graft.

Examples 13–32 A

Preparation and Evaluation of Coatings

Coating compositions were prepared using the lactone modified polyether product produced in Example I. Control coatings containing the same compositions were also prepared for comparative analysis, except that the lactone modified polyether was substituted with the corresponding unmodified polyether. These control examples are identified by the corresponding example number followed by "A".

The coatings were tested and evaluated using the following procedures:

COATINGS TESTING AND ANALYSIS

| Test | Procedure and Evaluation |
|---|---|
| Olsen Button | ASTM E-643-78. The degree of coating integrity was visually observed and reported. |
| Reverse Impact | ASTM D-2794-69 (1974); with the reported results in in-lbs at highest passing of test. |
| Olsen draw | Using first and second deep draw testing described in the instruction manual entitled "Ductomatic Sheet Metal Tester A-12", Instruction Booklet No. 70-6, Bulletin 85, published by the Olsen Testing Machine Co., pp 3, 8 & 9 (1970). The ability of the coating to withstand partial or complete (failure) delamination is reported. |
| Hardness | Sward Rocker test as disclosed in Paint Testing Manual, G. G Sward (editor), ASTM Publication 500, 13th ed., p. 286 (1972). |
| Gloss | ASTM D-523; reported at 45° and 60°. |

The coatings were prepared as follows, with the results set forth in Table 3.

Examples 13–18A

These examples describe clear coating compositions free of pigment formulations. The lactone grafted polyether, or corresponding unmodified polyether for the control example, was mixed with the indicated type and amount of crosslinker set forth in Table 3. The mixture also contained 300 parts of Carrier II and 0.4 parts of Cure initiator I. The coatings were applied to standard, cold rolled, steel, 4″×12″ test panels having a thickness of 0.036″, using a doctor blade to provide a coating depth of 2 and 4 ml wet, providing a dry film coating of 0.5 and 1.0 ml thicknesses, respectively. The coatings were air dried for between 1 to 48 hours and cured by heating at 177° C. for 30 minutes. The coatings were then tested and the results set forth in Table 3.

Examples 19-27A

Pigment grinds were prepared on a media mill using ceramic beads and Hegman grind values of 5 or more were obtained. Coatings were prepared containing the indicated amount and type of crosslinker in Table 3 based on 100 weight parts of lactone modified polyether, or unmodified polyether for the control examples. The coating compositions initially contained 247 parts Carrier I, 53 parts Solvent I, 1.7 parts Dispersant I, and the indicated amount of titanium dioxide, $TiO_2$, pigment.

Coated metal substrates were prepared and analyzed as set forth above, except that the curing conditions for Example 24-25A involved heating at 150° C. for 45 minutes.

Examples 28-32A

Pigment grinds were prepared on a media mill using ceramic beads and Hegman grind values of 4.5 or better obtained. Coating compositions were prepared using the type and amount of crosslinker and zinc pigment noted in Table 3, based on 100 weight parts of lactone modified polyether, or unmodified polyether in the control examples. The composition initially contained 244 parts Carrier I, 56 parts Solvent I, 6 parts Dispersent I, 20 parts Anti-settling agent I, and 3 parts Drier I.

Coated metal substrates were prepared and tested as in the previous examples.

TABLE 3

COATING COMPOSITIONS AND PROPERTIES

| Example (A = Comparative Control) | Coating Additives | | Olsen Button | Reverse Impact (in-lbs) | Olsen Draw | | Hardness | Gloss | |
|---|---|---|---|---|---|---|---|---|---|
| | Crosslinker (amount)[a] | Pigment (amount)[a] | | | First | Second | | 45° | 60° |
| 13 | I(5) | None | P | >160 | P | F | — | — | — |
| 13A | I(5) | None | P | >160 | P | F | — | — | — |
| 14 | I(10) | None | F | 140* | F | — | — | — | — |
| 14A | I(10) | None | F | 120 | F | — | — | — | — |
| 15 | II(7.5) | None | P | >160 | P | Delam. | — | — | — |
| 15A | II(7.5) | None | P | >160 | P | Delam. | — | — | — |
| 16 | II(15) | None | P | >160 | P | P* | — | — | — |
| 16A | II(15) | None | P | >160 | P | F | — | — | — |
| 17 | III(10) | None | P | >160 | P | F | — | — | — |
| 17A | III(10) | None | P | >160 | P | F | — | — | — |
| 18 | III(20) | None | P | >160 | P | F | — | — | — |
| 18A | III(20) | None | P | >160 | P | F | — | — | — |
| 19 | None | $TiO_2$(85) | P | >160 | P | ⅜" Delam.* | 59* | 61* | 95* |
| 19A | None | $TiO_2$(85) | P | >160 | P | ½" Delam.* | 50 | 54 | 76 |
| 20 | I(5) | $TiO_2$(85) | F | >160 | — | — | 74* | 35* | 57* |
| 20A | I(5) | $TiO_2$(85) | F | >160 | — | — | 48 | 22 | 39 |
| 21 | I(10) | $TiO_2$(85) | F | 60* | — | — | 76* | 38* | 61* |
| 21A | I(10) | $TiO_2$(85) | F | 20 | — | — | 47 | 27 | 46 |
| 22 | II(7.5) | $TiO_2$(85) | P | >160 | P | 1/16" Delam.* | 80* | 24 | 40 |
| 22A | II(7.5) | $TiO_2$(85) | P | >160 | P | ¼" Delam.* | 53 | 24 | 37 |
| 23 | II(15) | $TiO_2$(85) | P | >160 | P | ⅛" Delam.* | 83* | 16* | 24* |
| 23A | II(15) | $TiO_2$(85) | P | >160 | P | ⅜" Delam.* | 50 | 15 | 23 |
| 24 | III(10) | $TiO_2$(85) | P | >160 | ⅜" Delam. | — | 48* | 9* | 12* |
| 24A | III(10) | $TiO_2$(85) | P | >160 | ¼" Delam. | — | 46 | 8 | 10 |
| 25 | III(20) | $TiO_2$(85) | P | >160 | ⅜" Delam. | — | 73 | 9 | 12 |
| 25A | III(20) | $TiO_2$(85) | — | — | — | — | — | — | — |
| 26 | IV(9) | $TiO_2$(85) | Good* | >160 | — | — | 54* | 57* | 105* |
| 26A | IV(9) | $TiO_2$(85) | Fair | >160 | — | — | 39 | 49 | 84 |
| 27 | IV(18) | $TiO_2$(85) | Fair* | >160 | — | — | 64* | 55* | 101* |
| 27A | IV(18) | $TiO_2$(85) | Poor | >160 | — | — | 59 | 49 | 87 |
| 28 | None | Zinc(660) | P | >160 | F | — | — | — | — |
| 28A | None | Zinc(660) | P | >160 | F | — | — | — | — |
| 29 | II(7.5) | Zinc(660) | Cracked | 60 | F | — | — | — | — |
| 29A | II(7.5) | Zinc(660) | Cracked | 100 | F | — | — | — | — |
| 30 | II(15) | Zinc(660) | Cracked | 120 | Sl. F* | — | — | — | — |
| 30A | II(15) | Zinc(660) | Cracked | 120 | Sev. F | — | — | — | — |
| 31 | IV(6.2) | Zinc(660) | P | >160 | P | — | — | — | — |
| 31A | IV(6.2) | Zinc(660) | P | >160 | P | — | — | — | — |
| 32 | IV(12.5) | Zinc(660) | P | >160 | P | — | — | — | — |
| 32A | IV(12.5) | Zinc(660) | P | >160 | P | — | — | — | — |

*Superior performance over comparative control
[a]parts by weight per 100 parts lactone grafted polyethers.

What is claimed is:

1. In a coating composition comprising a binder for deformable substrates the improvement wherein said binder is a high molecular weight polymer which is the product of reacting, to completion in the presence of a catalyst, (a) in the presence of a solvent at or just below the reflux temperature, or (b) in the absence of a solvent at at least about 100° C.:

(1) a lactone of the formula:

(I)

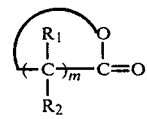

wherein each $R_1$ and $R_2$ is individually hydrogen or lower alkyl, and m is from 3 to about 12; and (2) a hydroxyalkoxy phenoxy polyether having the average formula:

$$G+O-D-O-\underset{\underset{OH}{|}}{E}{\!\!\!\!}_n O-D-O-G \quad (II)$$

wherein D is the residue of a dihydroxy aromatic hydrocarbon, E—OH is the hydroxy residue of an epoxide, G is either hydrogen or the residue of a capped or uncapped epoxide; and n is sufficient to provide a weight average molecular weight of at least about 30,000, to form a graft copolymer wherein the polyether is substantially free of 1,2-epoxy groups.

2. The composition of claim 1 wherein said polymer has the average formula:

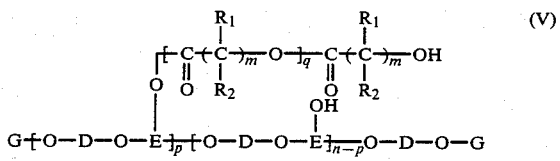

wherein D, E, G, R₁, R₂, m and n are as defined previously; p is from about 0.01 n to n; and q is ≧0.

3. The composition of claim 2 wherein D is

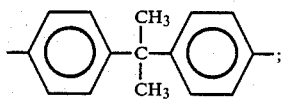

E is

R₁ and R₂ are hydrogen; and m is 5.

4. The composition of claim 1 wherein said epoxide has the formula:

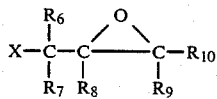

wherein R₆, R₇, R₈, R₉ and R₁₀ are individually hydrogen or methyl and X is an electron donating group.

5. The composition of claim 4 wherein R₆, R₇, R₈, R₉ and R₁₀ are hydrogen; and X is halogen.

6. The composition of claim 1 wherein said dihydroxy aromatic hydrocarbon has the formula:

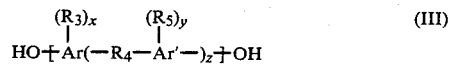

wherein Ar and Ar' are individually aromatic divalent hydrocarbons; R₃ and R₅ are individually lower alkyl, halogen, or lower alkoxy; R₄ is a covalent bond or divalent radical; x and y are from 0 to a maximum value corresponding to the number of substitutable sites on Ar and Ar', respectively; and z is 0 or 1.

7. The composition of claim 6 wherein Ar and Ar' are phenylene; R₄ is

x and y are each 0; and z is 1.

8. The composition of claim 1 wherein each R₁ and R₂ is hydrogen; and m is 5.

9. The composition of claim 1 additionally containing a carrier, a crosslinker and a cure initiator.

10. The composition of claim 9 additionally containing a pigment.

11. A coated article comprising a deformable substrate which is coated with the composition of claim 1.

12. The article of claim 11 wherein said substrate is sheet metal, wire or an elastic material.

13. A coated article comprising a deformable substrate which is coated with a cured composition of claim 9.

14. A process for producing a coated, deformed article which comprises:
(1) coating a deformable article with a coating composition containing a binder of claim 1;
(2) drying said coated article; and
(3) deforming said article.

15. A pre-coated, deformed article produced by the process of claim 14.

* * * * *

UNITED STATES PATENT AND TRADEMARK OFFICE
CERTIFICATE OF CORRECTION

PATENT NO. : 4,559,247
DATED : December 17, 1985
INVENTOR(S) : Peter W. Kopf et al.

It is certified that error appears in the above-identified patent and that said Letters Patent is hereby corrected as shown below:

Column 1, line 20, the word "mamy" should be -- many --.

Column 1, line 33, the word "distored" should be -- distorte --.

Column 3, line 24, the word "alkylene" should be -- alkylenes --.

Column 5, line 59, the word "ad" should be -- and --.

Column 6, line 2, the word "amcount" should be -- amount --.

Signed and Sealed this

Twenty-first Day of November, 1989

Attest:

JEFFREY M. SAMUELS

Attesting Officer     Acting Commissioner of Patents and Trademarks